United States Patent
Kottapalli et al.

(10) Patent No.: US 11,411,867 B1
(45) Date of Patent: Aug. 9, 2022

(54) DYNAMICALLY MANAGING ENCRYPTION FOR VIRTUAL ROUTING (VRF) AND FORWARDING (VRF) USING ROUTE TARGETS AND UNIQUE VRF IDENTIFIERS

(71) Applicant: VMware, Inc., Palo Alto, CA (US)

(72) Inventors: Ravi Kumar Reddy Kottapalli, Bangalore (IN); Srinivas Sampatkumar Hemige, Bangalore (IN); Mithil Prakash Rangdale, Bangalore (IN); Shilpa Sharma, Bangalore (IN); Avinash Savaliya, Gujarat (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/236,230

(22) Filed: Apr. 21, 2021

(51) Int. Cl.
| | |
|---|---|
| *G06F 15/173* | (2006.01) |
| *H04L 45/58* | (2022.01) |
| *H04L 9/08* | (2006.01) |
| *H04L 45/24* | (2022.01) |
| *H04L 45/745* | (2022.01) |

(52) U.S. Cl.
CPC ........ *H04L 45/583* (2013.01); *H04L 9/0825* (2013.01); *H04L 45/24* (2013.01); *H04L 45/745* (2013.01)

(58) Field of Classification Search
CPC ..... H04L 45/583; H04L 9/0825; H04L 45/24; H04L 45/745
See application file for complete search history.

(56) References Cited

U.S. PATENT DOCUMENTS

| | | | | |
|---|---|---|---|---|
| 7,486,659 | B1 * | 2/2009 | Unbehagen | H04L 12/4633 370/395.31 |
| 8,284,943 | B2 * | 10/2012 | Carrasco | H04L 63/0272 380/278 |
| 9,407,544 | B1 * | 8/2016 | Maino | H04L 45/586 |
| 2014/0115325 | A1 * | 4/2014 | Detienne | H04L 63/0428 713/160 |
| 2016/0315808 | A1 * | 10/2016 | Saavedra | H04L 49/00 |
| 2019/0182213 | A1 * | 6/2019 | Saavedra | H04L 63/0263 |
| 2020/0274791 | A1 * | 8/2020 | Mishra | H04L 45/22 |

* cited by examiner

*Primary Examiner* — Oleg Survillo

(57) ABSTRACT

Described herein are systems, methods, and software to manage virtual routing and forwarding (VRF) in a computing environments. In one example, a management service identifies a registration or import of a route target (RT) to communicate in a VRF and identifies a first unique identifier associated with the RT. The management service further identifies a second unique identifier associated with the VRF and compares the first unique identifier to the second unique identifier. When the unique identifiers match, the management service determines that intra-VRF encryption is required for the communication. In contrast, when the unique identifiers do not match, then the management service determine that inter-VRF encryption is required for the communication.

20 Claims, 7 Drawing Sheets

| VRF NAME 610 | VRF UNIQUE ID 612 | ORIGIN DEVICES 614 | RTS 616 | INTRA-VRF ENCRYPTION PARAMETERS 618 | INTER-VRF ENCRYPTION PARAMETERS 620 |
|---|---|---|---|---|---|
| BLUE | YYYY | POLICY | 10:10 100:100 | *PARAMETERS* | *PARAMETERS* |
| RED | XXXX | POLICY | 20:20 200:200 | *PARAMETERS* | *PARAMETERS* |

FIGURE 6

DYNAMICALLY MANAGING ENCRYPTION FOR VIRTUAL ROUTING (VRF) AND FORWARDING (VRF) USING ROUTE TARGETS AND UNIQUE VRF IDENTIFIERS

TECHNICAL BACKGROUND

In computing environments, virtual routing and forwarding (VRF) is used to allow multiple instances of a routing table on a single logical or physical router. This permits multiple network paths without the need for multiple routers or switches. For example, a first group of computing elements, such as physical computers or virtual machines, may be allocated to a first VRF, while a second group of computing elements may be allocated to a second VRF. Each of the VRFs may be associated with rules or policies that can be used to manage the communications by the computing elements allocated to the VRF.

While VRFs provide a mechanism to permit multiple network paths on a single routing device, difficulties can arise in managing the policies and rules for the different VRFs. The difficulties may be associated with allocating the rules, which may require static modification or deletion to the rules, may be associated with managing what communications are encrypted or what encryption should be used, or some other difficulty associated with configuring and maintaining VRFs across routing gateways in a computing environment.

SUMMARY

The technology described herein manages policy configurations for virtual routing and forwarding (VRF) using route targets (RTs) and unique VRF identifiers. In one implementation, a management service may identify one or more virtual routing and forwarding (VRFs) for a computing environment and may allocate a unique identifier to each of the one or more VRFs. The management service may further identify a registration of a route target (RT) to communicate with a VRF of the one or more VRFs and identify a unique identifier of the one or more unique identifiers associated with the RT. Once identified, the management service may determine whether communications associated with the RT in the VRF require intra-VRF encryption or inter-VRF encryption based on the unique identifier. If communications associated with the RT require intra-VRF encryption, the management service determines one or more intra-VRF encryption keys to an edge gateway associated with the RT. In contrast, if the management service determines that communications associated with the RT require inter-VRF encryption, the management service communicates one or more inter-VRF encryption keys to an edge gateway associated with the RT.

BRIEF DESCRIPTION OF THE DRAWINGS

FIG. 6 illustrates a data structure to manage encryption information for VRFs.

DETAILED DESCRIPTION

Figure 1:
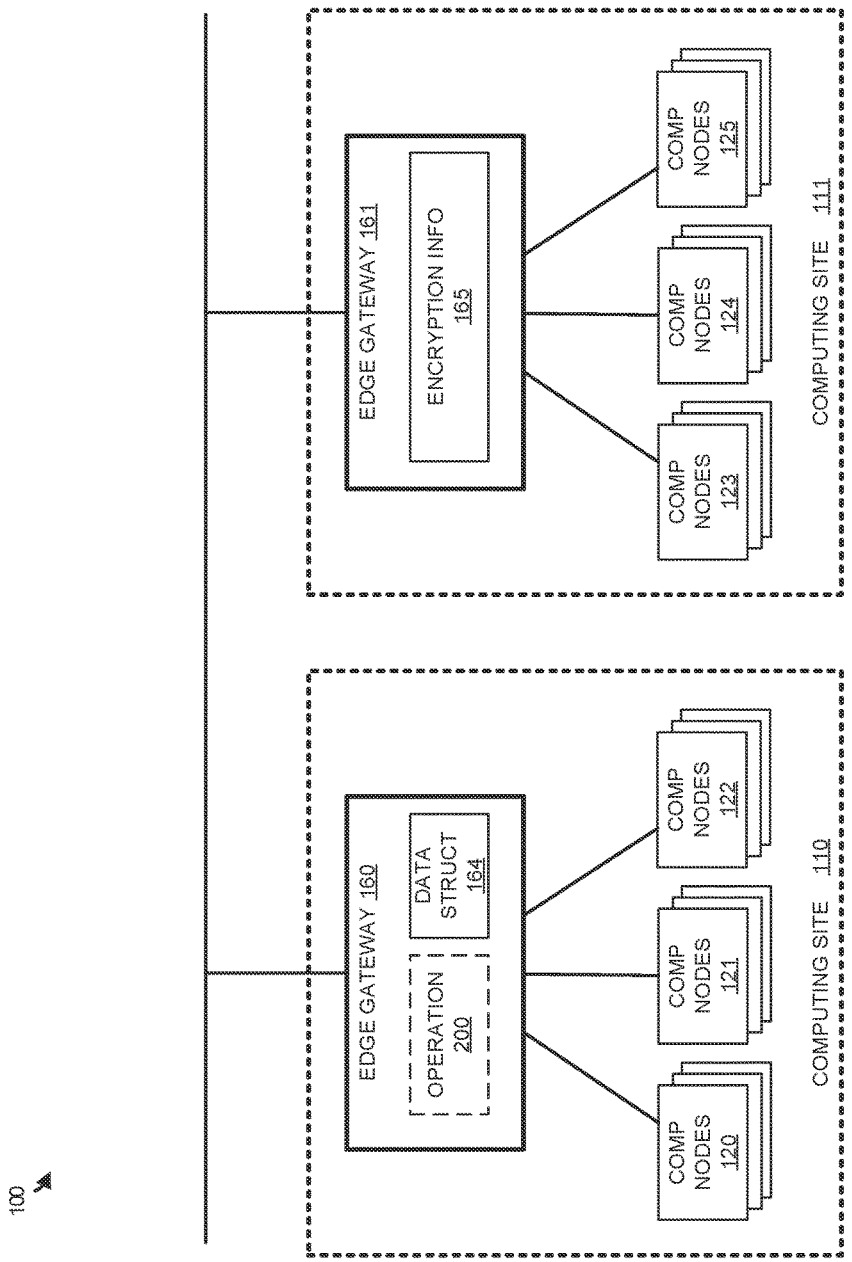
FIG. 1 illustrates a computing environment to manage encryption information for virtual routing and forwarding (VRF).

FIG. 1 illustrates a computing environment 100 to manage encryption information for virtual routing and forwarding (VRF) according to an implementation of the technology described herein. Computing environment 100 includes edge gateways 160-161, which provide connectivity for computing nodes 120-125. Computing nodes 120-125 may comprise physical computing systems, such as desktop computers, laptop computers, servers, and the like, or may comprise virtual computing elements, such as virtual machines or containers. In some implementations, computing nodes 120-125 may each be coupled to a customer edge gateway or router that, in turn, is coupled to a corresponding edge gateway of edge gateways 160-161.

Edge gateways 160-161 are used to implement VRFs for computing nodes 120-125, wherein VRFs are used to allow multiple instances of a routing table on a single logical or physical routing element. A routing table is stored on the routing element, such as edge gateways 150-151, to list routes to particular network destinations. This may permit a first routing table to be maintained for a first network of computing elements, while a second routing table is maintained for a second network of computing elements. In managing the different VRFs of computing environment 100, each of the VRFs are allocated a unique identifier and use route targets (RTs), wherein RTs are a well known identifier used by border gateway protocol (BGP) to indicate which VRFs a private network prefix should be imported to. As an example, edge gateways 160-161 may together provide a common VRF that permits a virtual private network (VPN) to be established between the edge gateways. When an RT is imported from edge gateway 161, a management service providing operation 200 at edge gateway 160 may identify a unique VRF identifier associated with the RT and determine encryption parameters to support the import based on the unique identifier.

In some examples, when an RT is registered at a gateway, the RT may be associated with a VRF and a unique VRF identifier. Accordingly, when an RT is imported to a VRF, the unique identifier associated with the RT may be compared to the unique identifier associated with the importing VRF. If the unique identifiers match, then the RT may be classified as intra-VRF, and encryption keys may be communicated to the edge gateway associated with the RT in accordance with the inter-VRF determination. In particular, the key may permit computing elements in the same VRF to communicate via edge gateways 160-161. In contrast, if the unique identifiers do not match, then the imported RT may be classified as an inter-VRF connection and encryption keys may be provided to the edge gateway associated with imported RT. The inter-VRF encryption keys may be used when the edge gateway determines that the imported RT comprises an origin RT for a different VRF.

For example, an RT may be registered at edge gateway 161 as an origin RT with a first VRF. If the RT is imported to a second VRF at edge gateway 160, the unique value associated with the first VRF may compared to the unique value associated with the second VRF. When the values do not match, edge gateway 160 may determine that inter-VRF encryption is required. In contrast, if the unique value associated with RT matched the unique value for the importing VRF, then edge gateway 160 may determine that intra-VRF encryption is required.

Figure 2:
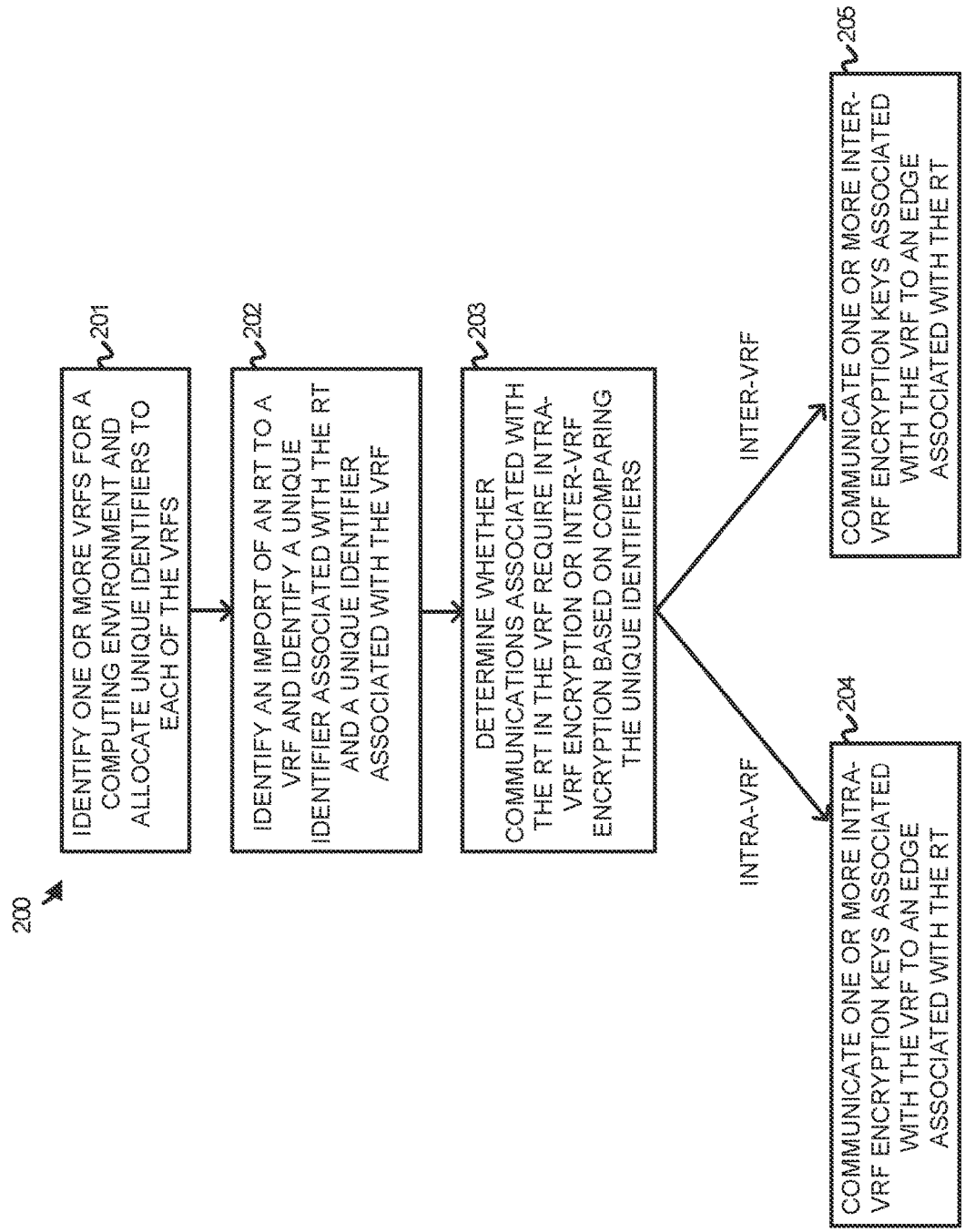
FIG. 2 illustrates a management operation to manage encryption information for VRFs.

FIG. 2 illustrates a management operation 200 to manage encryption information for VRFs according to an implementation. The steps of operation 200 are referenced parenthetically in the paragraphs that follow with references to systems and elements of computing environment 100 of FIG. 1.

As depicted, operation 200 includes identifying (201) one or more VRFs for a computing environment and allocating a unique identifier to each of the VRFs. For example, an administrator may define two VRFs, wherein each of the VRFs may include a different name and are each allocated a different unique identifier. The unique identifier may be determined via a hash operation, a pseudo-random value generator, or by some other mechanism. In identifying the one or more VRFs an administrator may indicate one or more RTs as origin RTs for each of the VRFs, wherein an RT is used to indicate which of the VRFs a private network prefix should be imported to. For example, computing nodes 120 may represent computers allocated a first prefix, while computing nodes 121 may represent computers allocated a second prefix. Each of the prefixes may correspond to a different RT that can be imported to one or more VRFs.

Once each of the VRFs is allocated a unique identifier, operation 200 further identifies (202) an import of an RT to communicate with a VRF of the one or more VRFs and identifies a unique identifier of the one or more identifiers associated with the RT. For example, computing nodes 125 may represent computing nodes associated with a first RT and registered as an origin RT to a first VRF at edge gateway 161. When the RT is imported at edge gateway 160, edge gateway 160 may identify the unique identifier associated with the first VRF (i.e., the unique identifier for the origin RT in the VRF). After identifying the unique VRF identifier associated with the RT, operation 200 further determines (203) whether communications associated with the RT in the VRF require intra-VRF encryption or inter-VRF encryption based on the unique identifier.

In some implementations, once the unique VRF identifier is identified in association with the imported RT, or the unique VRF identifier that the RT is registered with as an origin RT, edge gateway 160 may identify the unique identifier for the VRF importing the RT. Once both of the unique identifiers are identified, the identifiers may be compared to determine if the identifiers match. When the unique identifiers match, operation 200 may determine that the importation requires intra-VRF and may communicate (204) one or more intra-VRF encryption keys associated with the VRF to an edge associated with the RT. In contrast, when the unique identifiers do not match, operation 200 may communicate (205) one or more inter-VRF encryption keys to an edge gateway associated with the RT.

In some implementations, edge gateway 160 may maintain data structure 164 that associates each of the unique VRF identifiers with one or more RTs imported for the VRF and encryption keys to communicate between the gateways providing the VRFs. As an example, if computing nodes 125 comprise computing nodes for an RT that is being imported into a VRF, the unique identifier associated with the RT (i.e., the unique identifier for VRF that the RT was registered as an origin RT) may be compared to the unique identifier for the VRF that is importing the RT. When the unique identifiers match, via data structure 164, then encryption information associated with intra-VRF encryption may be provided to edge gateway 161 to support communications for computing nodes 125. Thus, if computing nodes 120 and computing nodes 125 were in the same VRF, edge gateway 161 may manage the encryption of the tunneling packets to provide intra-VRF communications from computing nodes 125 to computing nodes 120.

In contrast, when the unique identifiers do not match for the RT and the importing VRF, operation 200 may determine that inter-VRF encryption is required and may distribute the inter-VRF encryption keys as required. For example, computing nodes 125 may be associated with or registered with a first RT and a first unique VRF identifier and computing nodes 120 may be associated with a second RT and a second unique VRF identifier. When the first RT is imported into the VRF associated with the second unique identifier, operation 200 may determine that the communication between the RTs requires inter-VRF encryption and may distribute keys as required for the communication. As a result, when a computing node of computing nodes 125 generates a packet destined for a computing node in computing nodes 120, edge gateway 161 may use the encryption information provided by edge gateway 160 to encrypt the packet and communicate the packet to edge gateway 160. Once received, edge gateway 160 may decrypt the packet and forward the packet to the corresponding computing element.

In some implementations, edge gateway 160 may generate the encryption keys for the intra-VRF communications and the inter-VRF communications. These encryption keys may be generated when they are required, such as when a new inter-VRF connection is required, may be generated when a VRF is created, or may be generated at some other instance. In some examples, the encryption keys may expire causing edge gateway 160 to update the encryption keys and distribute the encryption keys to other edge gateways in the computing environment. The updates to the encryption keys may be periodic, may occur when an RT is imported into a VRF, or may occur at some other interval.

In some examples, in addition to providing the encryption parameters, edge gateway 160 may provide information about other RTs in the imported VRF to edge gateway 161. This information may be used by edge gateway 161 to exchange border gateway protocol (BGP) communications with one or more other gateways to identify next-hop information associated with prefixes for the other RTs. Similarly, at least gateway 160 may exchange BGP information with edge gateway 161 to obtain prefix information associated with the imported RT.

Although demonstrated with two edge gateways 160-161 in computing environment 100, it should be understood that any number of edge gateways may be used to provide connectivity for computing elements. In some examples, one of the edge gateways, in the example of computing environment 100, may act as the server for the encryption keys and distribute the encryption keys to other edge gateways as required. As an example, when an RT is imported into a VRF, the server may identify the import request and compare the unique identifier associated with the imported RT with the unique identifier associated with the VRF. The server may then be responsible for distributing the required encryption keys to the other gateways to permit inter and intra VRF communications. In some examples, agents then may provide registration information for each of VRFs to the server and manage the exchange of the encryption keys to permit communications for the various RTs.

Figure 3:
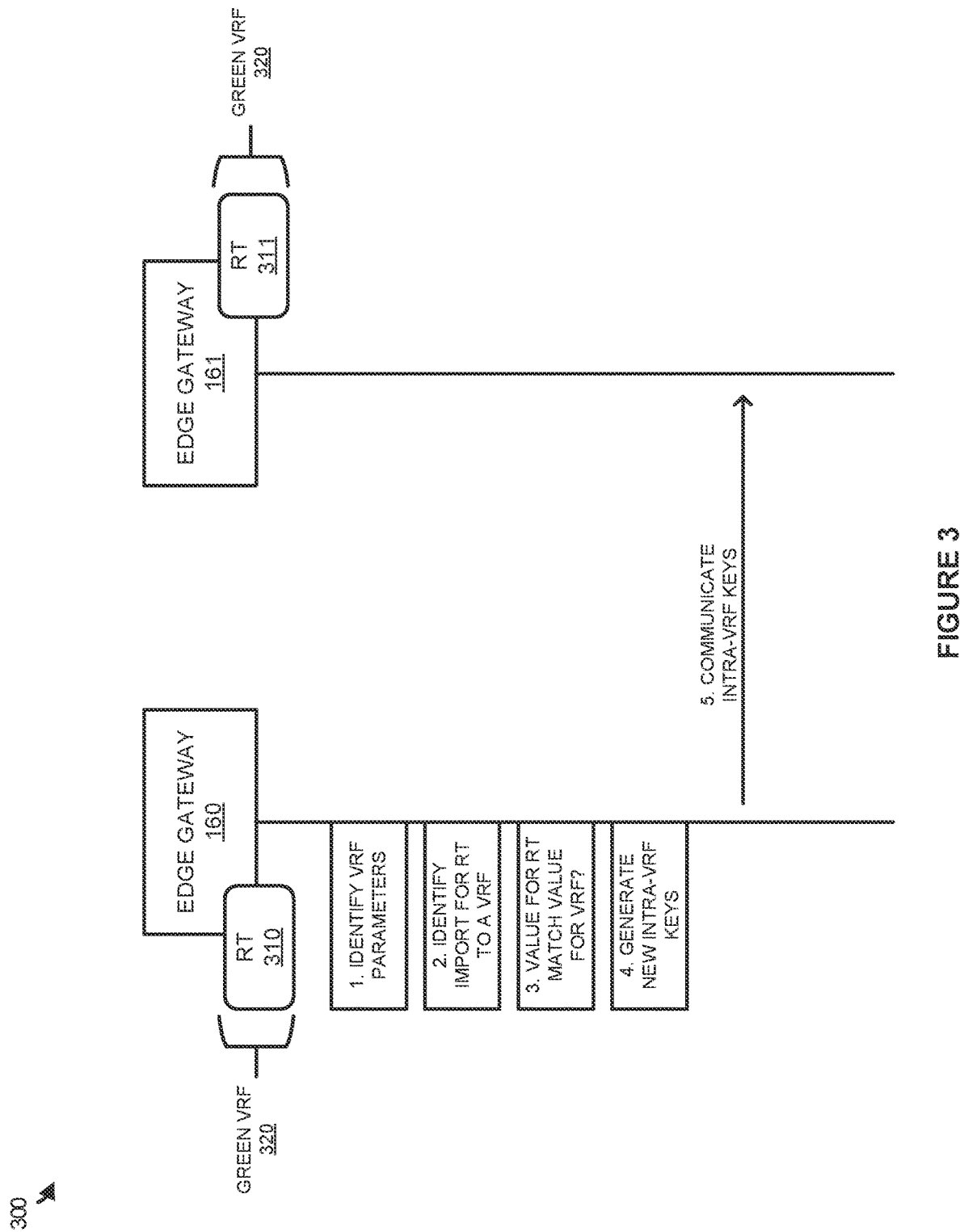
FIGS. 3 and 4 illustrate timing diagrams for managing encryption information for VRFs.

FIG. 3 illustrates a timing diagram 300 to manage encryption information for VRFs according to an implementation. Timing diagram 300 includes edge gateways 160-161 from computing environment 100 of FIG. 1 and further includes RTs 310-311, which are representative of RTs registered to green VRF 320.

As depicted, timing diagram 300 identifies, at step 1, VRF parameters associated with VRFs in the computing environment. The VRF parameters may include names for the VRFs, unique identifiers associated with the VRFs, origin RTs associated with the VRFs, or some other parameter information associated with the VRFs. Once the parameters are identified for the VRFs or the VRFs are registered, edge gateway 160 identifies, at step 2, in import of an RT into a VRF at edge gateway 160. For example, an administrator may import RT 311 into the green VRF 320. In response to the import request, edge gateway 160 may identify a unique identifier associated with RT 311, wherein the unique identifier may be assigned to the RT when the RT is registered as an origin RT for green VRF 320. Additionally, edge gateway 160 may determine the unique identifier associated with green VRF 320.

Once both of the unique identifiers are identified by edge gateway 160, edge gateway 160 may determine whether the unique value associated with the RT matches the unique value for the VRF that is importing the RT, at step 3. When it is determined that the unique values match, edge gateway may generate, at step 4, new intra-VRF keys to support the intra-VRF communications between edge gateways 160-161 for green VRF 320 and may communicate, at step 5, the intra-VRF keys to edge gateway 161. Once communicated, a computing node that belongs to RT 311 may communicate a packet that is received by edge gateway 161. In response to receiving the packet, edge gateway 161 may determine that the packet is destined for a computing node behind edge gateway 160. Accordingly, edge gateway 161 may apply the encryption information provided by edge gateway 160 and communicate the encapsulated packet to edge gateway 160. Once the packet is received, edge gateway 160 may apply local encryption key information to the encrypted packet and forward the packet toward the computing node.

In some implementations, edge gateway 160 may maintain a data structure that is used to associated unique identifiers for VRFs with imported RTs and encryption keys to support communications between the different RTs. In the example, of a VRF with RTs that do not require inter-VRF communications or communications from a first VRF to a second VRF, the data structure may not include encryption keys or other parameters to support the communications. However, the data structure will include the encryption parameters to permit RTs across one or more gateways to provide intra-VRF communications. The encryption keys may be generated as they are required (e.g., when an RT is imported that requires the keys), may be generated when the VRF is created, or may be generated at some other instance.

In some examples, the encryption keys maintained by edge gateway 160 may expire or timeout. These timeouts may be periodic, may occur when a change occurs to the imported RTs (e.g., an addition or deletion of an RT), or may occur at some other interval. When the keys require an update, edge gateway 160 may generate one or more new encryption keys and communicate the keys to the one or more other gateways as required in the computing environment.

Figure 4:
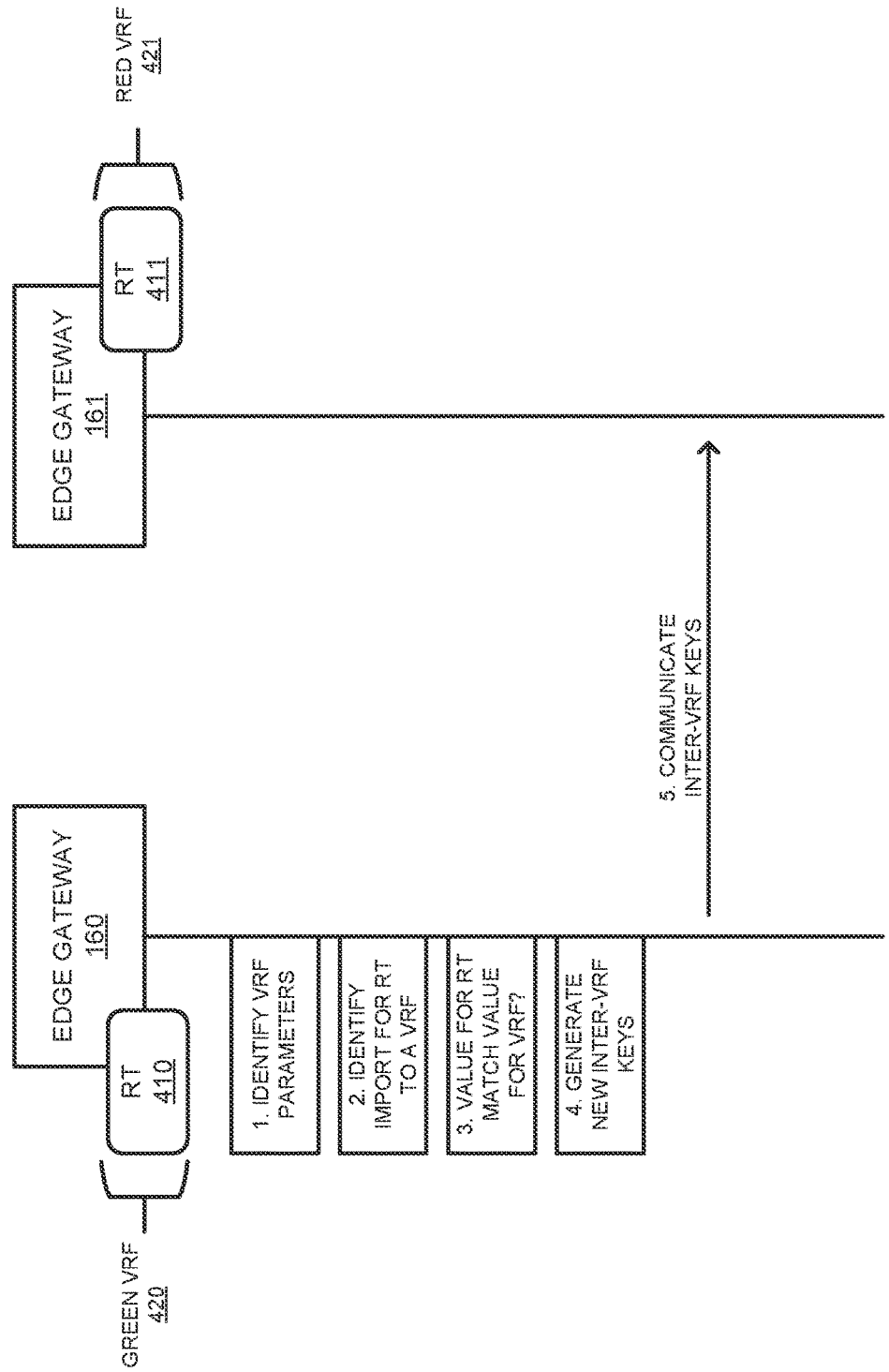

FIG. 4 illustrates a timing diagram 400 to manage encryption information for VRFs according to an implementation. Timing diagram 400 includes edge gateways 160-161 from computing environment 100 of FIG. 1 and further includes RTs 410-411, which correspond to VRFs 420-421, respectively.

As depicted, edge gateway 160 identifies registration information associated with one or more VRFs, wherein the registration information may include origin RTs for each of the VRFs, names for the VRFs, a unique identifier associated with each of the VRFs, or some other information associated with the VRFs. In some examples, the registration information may be defined by one or more administrators for each of the gateways, wherein the administrators may provide at least a portion of the aforementioned information. Once VRFs are defined by an administrator, RTs may be imported to a VRF to permit communications between the computing elements in the RT. Here, RT 410 is registered as an origin RT for green VRF 420, while RT 411 is registered with red VRF 421, wherein each of the VRFs may be associated with a different unique identifier.

Here, edge gateway 160 identifies an import of RT 411 into green VRF 420, at step 2. The import may be initiated by an administrator of the computing environment, wherein the administrator may identify the name of the VRF, and the RT associated with the import. In response to identifying the import, edge gateway 160 may determine, at step 3, whether the unique identifier associated with the RT matches the unique identifier associated with VRF for the import match. As described previously, when an import is identified for an RT, edge gateway 160 may identify a unique VRF identifier associated with the RT, which comprises a unique identifier associated with the VRF that RT 411 originates. Additionally, edge gateway 160 may identify the unique identifier associated the importing VRF. Once both unique identifiers are identified associated with the import, edge gateway 160 may determine whether the unique identifiers match.

When it is determined that the unique identifiers do not match, edge gateway 160 may generate new inter-VRF encryption keys, at step 4, and communicate the encryption keys to one or more related gateways associated with the RT, at step 5. The encryption keys may be used by computing elements behind a gateway to communicate with other computing elements behind other gateways. In the example of timing diagram 400, edge gateway 160 may provide encryption keys that permits computing elements associated with RT 411 to communicate with computing elements 410. In particular, when a packet is received by edge gateway 161 from a computing element in RT 411, the edge gateway may identify the destination corresponds to a computing element in RT 410. Once identified, edge gateway 161 may apply the encryption parameters to the packet and forward the packet to edge gateway 160.

In some implementations, when RT 411 is imported to RT 410, edge gateways 161-162 may use BGP to determine the prefixes available to communicate within the various VRFs. These BGP messages may determine the prefixes available to green VRF 420 at edge gateway 160 and the prefixes available to red VRF 421 at edge gateway 161.

In some examples, the encryption keys may timeout or expire, requiring updates to be provided to the gateways in the computing environment. The expiration may occur when a new RT is imported into a VRF, at periodic intervals, or at some other interval. For example, at periodic intervals, edge gateway 160 may determine that a period expired for encryption keys associated with the inter-VRF communications between RT 410 and RT 411. In response to identifying the expiration of the keys, edge gateway 160 may generate replacement keys and distribute the keys to the required gateways. In particular, using the example of RT 411 being imported into RT 410, edge gateway 160 may distribute the new encryption information to edge gateway 161.

Although demonstrated in the previous examples as importing an RT into a VRF, it should be understood that edge gateway 160 may be used to manage when RTs are removed from a VRF. In some implementations, an administrator may request that a RT is no longer imported as part of a VRF. In response to the request, edge gateway 160 may determine the edge gateway associated with the RT and distribute a notification indicating that the RT is no longer imported to green VRF 420. In response to the notification, BGP may be used by edge gateways 160-161 to determine prefixes available in each of the VRFs and update the routing configuration based on the prefixes. As a result, if RT 411 initiated a communication with a computing node in RT 410, edge gateway 161 may no longer possess the encryption parameters or addressing to permit the communication.

Figure 5:
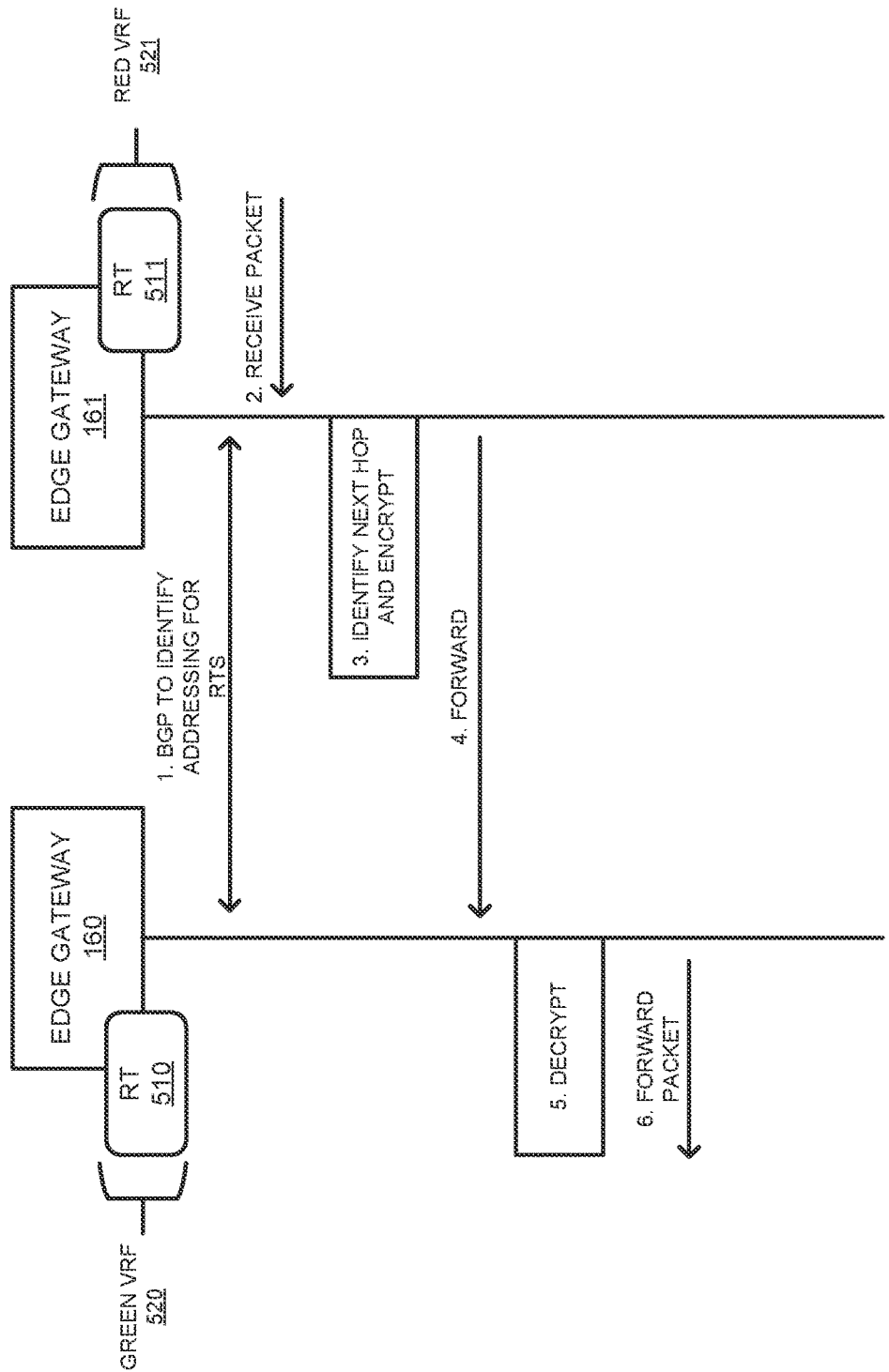
FIG. 5 illustrates a timing diagram to manage the communication of a packet between two edge gateways.

FIG. 5 illustrates a timing diagram 500 to manage the communication of a packet between two edge gateways according to an implementation. Timing diagram 500 includes edge gateways 160-161 from computing environment 100 of FIG. 1 and further includes RTs 510-511 which are registered to green VRF 520 and red VRF 521, respectively.

As described herein, VRFs may be used to allow multiple instances of a routing table to exist in a single router. In supporting the VRFs, a management service or server may be used to generate and distribute encryption keys or parameters that permit RTs at different edge gateways to communicate. Here, RT 511 registered with red VRF 521 is imported into green VRF 520, which includes RT 510. In response to a request to import TR 511 into green VRF 520, edge gateway 160 may identify a first unique identifier associated with the registered VRF for RT 511 and compare the first unique identifier to a second unique identifier associated with the VRF that is importing the RT. Here, because the first unique identifier and the second unique identifier do not match, edge gateway 160 may determine that the communications for the newly imported VRF should include inter-VRF encryption and may distribute encryption parameters comprising at least encryption keys to edge gateway 161 to permit communications with green VRF 520.

Once the encryption keys are distributed and information about the RTs associated with green VRF are provided to edge gateway 161, edge gateways 160-161 may exchange BGP communications to identify the prefixes associated with the RTs, at step 1. In particular, edge gateway 160 may obtain prefix information associated with the computing nodes for RT 511, while edge gateway 161 may obtain prefix information associated with RT 510.

Once the prefix information is obtained in association with the import of RT 511 to green VRF 520, edge gateway may identify, a packet from a computing node at step 2 that is associated with RT 511. In response to receiving the packet, edge gateway 161 may determine the destination address is associated with a next hop of edge gateway 160 (e.g., a computing node in RT 510 behind edge gateway 160), at step 3. Once determined, edge gateway 161 may encrypt the packet using the encryption parameters provided by edge gateway 160 in accordance with the inter-VRF communication with green VRF 520 and communicate the packet to edge gateway 160. In response to receiving the packet, edge gateway 160 may identify a source address in the packet, determine that the source corresponds to the green VRF, and apply the encryption parameters associated with the green VRF to decrypt the packet. Once decrypted, the packet may be forwarded toward the destination computing element. In some implementations, edge gateway 160 may represent a provider edge router and may forward the packet to customer edge router associated with the prefix.

In some examples, the encryption parameters that are provided to edge gateway 161 may expire, requiring edge gateway 160 to generate and distribute additional encryption parameters to other edge gateways in the computing environment. The expiration of the encryption keys may be periodic, may be based on RTs being imported or removed from a VRF, or may be based on some other interval. As an example, edge gateway 160 may periodically distribute new keys to edge gateway 161 to permit the inter-VRF communications and maintain a local copy of the keys to support the communications.

Although demonstrated in examples of FIG. 3-5 with a single VRF implemented at each edge gateway, it should be understood be understood that multiple VRFs may be implemented using each of the edge gateways. For example, an edge gateway may provide support for communications for three different gateways.

While demonstrated in the Examples of FIGS. 1-5 as including two gateways, it should be understood that any number of gateways may be used to implement the aforementioned operations. In some implementations, a gateway in the computing environment may be selected as the management server that obtains registration information associated with the various VRFs, such as a name for each of the VRF, origin RTs associated with the VRF, or some other information associated with each of the VRFs. When an RT is imported to a VRF, the unique value associated with the RT is compared to the unique value associated with the importing VRF (e.g., a unique value associated with an origin RT for the VRF) to determine whether the values match. The management server may then generate and distribute the encryption key parameters to the relevant edge gateways in the computing network, including at least the edge gateway with the imported RT.

FIG. 6 illustrates a data structure 600 to manage encryption information for VRFs according to an implementation. Data structure 600 includes columns for VRF name 610, VRF unique identifier (ID) 612, origin devices 614, RTs 616, intra-VRF parameters 618, and inter-VRF parameters 620. For each VRF name in VRF names 610, a unique identifier is generated using hashing, pseudo-random value generation, or some other mechanism, and is further associated with RTs associated with the VRF, policy rules for the communications between the VRFs, and inter-VRF and intra-VRF encryption parameters for communications of the VRFs. The encryption parameters may be generated as they are required, such as when an RT is imported into a VRF, may be generated in anticipation or prior to an RT being imported to the VRF, or may be generated at some other instance.

In a computing environment, gateways may provide VRFs that are used to provide multiple routing tables on a single networking element. To establish a VRF, an administrator in the computing environment may define VRF names, origin RTs, and other information associated with the VRF and a data structure 600 may be generated to maintain information about the VRF. When an RT at another gateway is to be imported into a VRF, data structure 600 may be checked to determine whether the import requires intra-VRF communications or inter-VRF communications. In some implementations, the edge gateway maintaining data structure 600, referred to as the VRF management server, may identify a unique identifier from VRF unique ID 612 associated with the RT being imported. In particular, each RT may only be registered as an origin RT for a single VRF. For example, a first RT at a first gateway may be registered as an origin RT with a first VRF, while a second RT at a second gateway may be registered as an origin RT with the first VRF. When the first gateway imports the second RT into the first VRF, a unique identifier may be identified for the second RT and may also be identified for the importing VRF. Once it is determined that the two unique values match because the imported RT is an origin RT associated with the same VRF, encryption parameters may be distributed from intra-VRF encryption parameters 618.

Although demonstrated in the previous example as importing an RT associated with intra-VRF communications (i.e., the unique identifiers match), similar operations may be performed when the unique value associated with the RT does not match a unique value associated with the importing VRF. Once the gateway determines that the identifiers do not match, the gateway may generate and distribute inter-VRF encryption parameters from inter-VRF encryption parameters 620.

In some examples, the encryption parameters that are used to encrypt messages between gateways may expire. The expiration may occur at periodic intervals, when a new RT is imported to a VRF, or at some other interval. While demonstrated in the example of data structure 600 as including encryption parameters for both intra-VRF communications and inter-VRF communications, it should be understood that parameters may only be required when RTs are imported that require the parameters. For example, when an inter-VRF RT is imported, new inter-VRF encryption parameters may be generated and distributed to one or more gateways associated with the VRF to permit communications associated with the computing elements in the VRF. In addition to distributing the encryption information, the management sever on a first gateway may provide information about other RTs in the importing VRF to a second gateway associated with the newly imported RT. Once provided, the second gateway may use BGP to obtain IP address prefix information associated with each of the other RTs in the VRF. Similarly, other gateways associated with the VRF may use BGP to identify prefix information associated with the newly imported RT.

Referring to an example in data structure 600, when RT 100:100 is imported to a VRF associated with RT 10:10, the management server may determine whether inter-VRF or intra-VRF is required and distribute the associated encryption parameters. Additionally, the management server may indicate that 10:10 is in the importing VRF and direct the gateway associated with 100:100 to use BGP to obtain prefix information associated with 10:10.

Figure 7:
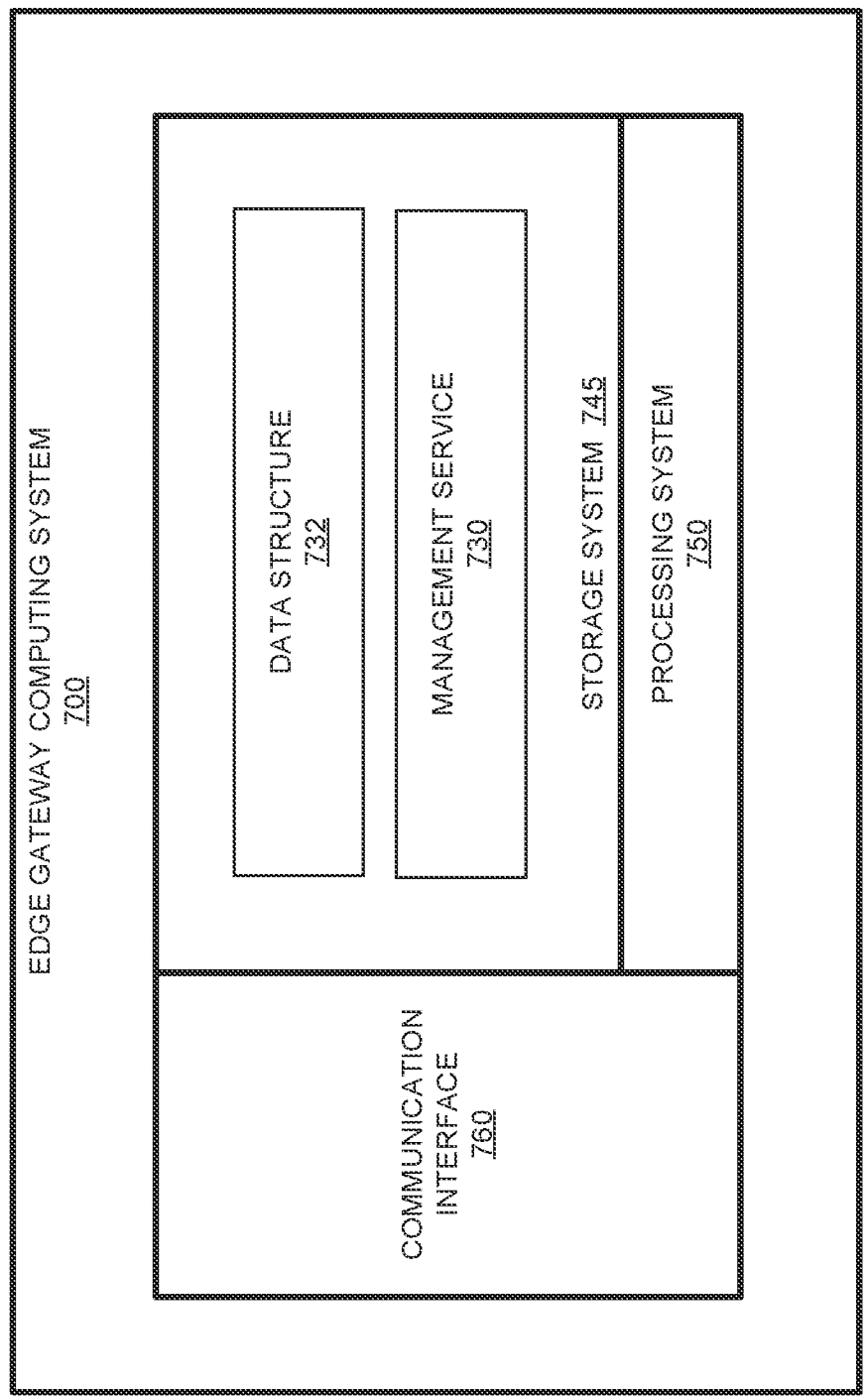
FIG. 7 illustrates a computing system to manage encryption information for VRFs.

FIG. 7 illustrates a computing system 700 to manage encryption information for VRFs according to an implementation. Computing system 600 is representative of any computing system or systems with which the various operational architectures, processes, scenarios, and sequences disclosed herein for an edge gateway can be implemented. Computing system 600 is an example of edge gateway 160 of FIG. 1, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 is configured to communicate with other edge gateways that can perform VRF functions as described herein. Communication interface 660 may further communicate with other gateways, such as client edge gateways or routers, switches, or some other computing element.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises data structure 732 and management service 730 capable of providing at least operation 200 of FIG. 2. The operating software on storage system 645 may further include an operating system, utilities, drivers, network interfaces, applications, or some other type of software. When read and executed by processing system 650 the operating software on storage system 645 directs computing system 600 to operate as described herein.

In at least one implementation, management service 730 directs processing system 750 to maintain data structure 732 based on VRF information associated with one or more VRFs in a computing environment. In particular, data structure 732 may be used to store associated each VRF in the one or more VRFs with a unique identifier, RTs associated with each VRF, and encryption parameters associated with each VRF. In some implementations, when an RT is registered, the RT may be designated an origin RT for a VRF. For example, at a first gateway, a first RT may be assigned as an origin to a VRF, wherein the registration is identified by management service 730. Additionally, at a second gateway, a second RT may be registered as an origin RT for the same VRF. When an administrator attempts to import the second RT into the VRF at the first gateway, the unique identifier associated with the second RT may be compared to the unique identifier associated with origin RTs in the VRF. Based on the comparison, management service 730 may determine whether the communication for the imported RT requires inter-VRF encryption parameters or intra-VRF encryption parameters. In particular if the two identified unique values match, then intra-VRF communication is required for the joining RT. In contrast, if the two identified unique values do not match, then inter-VRF communication is required for the joining RT.

Once it is determined that intra-VRF or inter-VRF encryption is required, management service 730 directs processing system 750 to generate and distribute encryption keys associated with the determination. For example, when an RT at a first gateway is imported into a VRF at a second gateway, management service 730 may determine whether intra-VRF or inter-VRF encryption based on the unique identifiers associated with the RT and the origin RT for the joining VRF. Once determined, any encryption parameters are generated for the inter-VRF or intra-VRF communication and distributed to the first gateway to permit communications between the first gateway and the second gateway. Accordingly, when a packet is received at the first gateway from a computing node behind the gateway, the gateway may determine a next-hop gateway for the packet (the second gateway), encrypt the packet using the encryption parameters, and forward the packet to the second gateway. Once received, the second gateway may decrypt the packet and forward the packet toward its destination.

In some examples, when an RT is imported to a VRF at a gateway, the gateway may distribute information about other RTs in the VRF to the gateway associated with the RT. BGP can be used by the gateway to obtain prefix information associated with each of the RTs to support the forwarding of packets. Similarly, the gateways associated with the other RTs may perform BGP exchanges to identify one or more IP address prefixes associated with the imported RT.

In some implementations, the encryption keys maintained in data structure 732 by management service 730 may expire. Consequently, management service 730 may direct processing system 750 to generate new encryption keys and distribute the encryption keys to gateways in the computing environment. The expiration of the encryption keys may occur periodically, when a new RT is imported to the VRF, or at some other interval.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   identifying one or more virtual routing and forwarding (VRFs) for a computing environment;
   allocating a unique identifier to each of the one or more VRFs;
   identifying an import of a route target (RT) to communicate with a VRF of the one or more VRFs;
   identifying a unique identifier of the one or more unique identifiers associated with the RT;
   determining whether communications associated with the RT in the VRF require intra-VRF encryption or inter-VRF encryption based on the unique identifier;
   in response to determining that communications associated with the RT require intra-VRF encryption, communicating one or more intra-VRF encryption keys to an edge gateway associated with the RT; and
   in response to determining that communications associated with the RT require inter-VRF encryption, communicating one or more inter-VRF encryption keys to an edge gateway associated with the RT.

2. The method of claim 1 further comprising:
   identifying one or more other edge gateways with one or more RTs in the VRF;
   communicating either the one or more intra-VRF encryption keys or the one or more inter-VRF encryption keys to the one or more other edge gateways.

3. The method of claim 1 further comprising:
   generating the one or more intra-VRF encryption keys when the RT requires intra-VRF encryption; or
   generating the one or more inter-VRF encryption keys when the RT requires inter-VRF encryption.

4. The method of claim 1, wherein determining whether the communications associated with the RT require intra-VRF encryption or inter-VRF encryption based on the unique identifier comprises:
   identifying a second unique identifier of the one or more unique identifiers associated with the VRF; and
   determining whether the unique identifier matches the second unique identifier;
   if the unique identifier does match the second unique identifier, determining that the RT requires intra-VRF encryption; and
   if the unique identifier does not match the second unique identifier, determining that the RT requires inter-VRF encryption.

5. The method of claim 1, wherein identifying the one or more VRFs for the computing environment comprises receiving parameters for the one or more VRFs from an administrator associated with the computing environment.

6. The method of claim 5, wherein the parameters comprise a name for each of the one or more VRFs and at least one origin RT associated with each of the one or more VRFs.

7. The method of claim 1 further comprising:
   at intervals, updating the one or more intra-VRF encryption keys or the one or more inter-VRF encryption keys; and
   communicating the updated one or more intra-VRF encryption keys or the one or more inter-VRF encryption keys to the edge gateway associated with the RT.

8. The method of claim 7, wherein the intervals comprise periodic intervals.

9. A computing apparatus comprising:
   a storage system;
   a processing system operatively coupled to the storage system; and
   program instructions stored on the storage system that, when executed by the processing system, direct the computing apparatus to:
   identify one or more virtual routing and forwarding (VRFs) for a computing environment;
   allocate a unique identifier to each of the one or more VRFs;
   identify an import of a route target (RT) to communicate with a VRF of the one or more VRFs;
   identify a unique identifier of the one or more unique identifiers associated with the RT;
   determine whether communications associated with the RT in the VRF require intra-VRF encryption or inter-VRF encryption based on the unique identifier;
   in response to determining that communications associated with the RT require intra-VRF encryption, communicate one or more intra-VRF encryption keys to an edge gateway associated with the RT; and in response to determining that communications associated with the RT require inter-VRF encryption, communicate one or more inter-VRF encryption keys to an edge gateway associated with the RT.

10. The computing apparatus of claim 9, wherein the program instructions further direct the computing apparatus to:
identify one or more other edge gateways with one or more RTs in the VRF;
communicate either the one or more intra-VRF encryption keys or the one or more inter-VRF encryption keys to the one or more other edge gateways.

11. The computing apparatus of claim 9, wherein the program instructions further direct the computing apparatus to:
generate the one or more intra-VRF encryption keys when the RT requires intra-VRF encryption; or
generate the one or more inter-VRF encryption keys when the RT requires inter-VRF encryption.

12. The computing apparatus of claim 9, wherein determining whether the communications associated with the RT require intra-VRF encryption or inter-VRF encryption based on the unique identifier comprises:
identifying a second unique identifier of the one or more unique identifiers associated with the VRF; and
determining whether the unique identifier matches the second unique identifier;
if the unique identifier does match the second unique identifier, determining that the RT requires intra-VRF encryption; and
if the unique identifier does not match the second unique identifier, determining that the RT requires inter-VRF encryption.

13. The computing apparatus of claim 9, wherein identifying the one or more VRFs for the computing environment comprises receiving parameters for the one or more VRFs from an administrator associated with the computing environment.

14. The computing apparatus of claim 13, wherein the parameters comprise a name for each of the one or more VRFs and at least one origin RT associated with each of the one or more VRFs.

15. The computing apparatus of claim 9, wherein the program instructions further direct the computing apparatus to:
at intervals, update the one or more intra-VRF encryption keys or the one or more inter-VRF encryption keys; and
communicating the updated one or more intra-VRF encryption keys or the one or more inter-VRF encryption keys to the edge gateway associated with the RT.

16. The computing apparatus of claim 15, wherein the intervals comprise periodic intervals.

17. A system comprising:
a plurality of edge gateways communicatively coupled using a network;
a first edge gateway of the plurality of edge gateways configured to:
identify one or more virtual routing and forwarding (VRFs) for the plurality of edge gateways;
allocate a unique identifier to each of the one or more VRFs;
identify an import of a route target (RT) to communicate with a VRF of the one or more VRFs;
identify a unique identifier of the one or more unique identifiers associated with the RT;
determine whether communications associated with the RT in the VRF require intra-VRF encryption or inter-VRF encryption based on the unique identifier;
in response to determining that communications associated with the RT require intra-VRF encryption, communicate one or more intra-VRF encryption keys to a second edge gateway of the plurality of edge gateways associated with the RT; and
in response to determining that communications associated with the RT require inter-VRF encryption, communicate one or more inter-VRF encryption keys to a second edge gateway of the plurality of edge gateways associated with the RT.

18. The system of claim 17, wherein the first edge gateway is further configured to communicate one or more other RTs to the second edge gateway.

19. The system of claim 18, wherein the second edge gateway, exchanges border gateway protocol (BGP) communications with one or more other edge gateways associated with the one or more other RTs to obtain addressing for computing nodes in the VRF.

20. The system of claim 17, wherein determining whether the communications associated with the RT require intra-VRF encryption or inter-VRF encryption based on the unique identifier comprises:
identifying a second unique identifier of the one or more unique identifiers associated with the VRF; and
determining whether the unique identifier matches the second unique identifier;
if the unique identifier does match the second unique identifier, determining that the RT requires intra-VRF encryption; and
if the unique identifier does not match the second unique identifier, determining that the RT requires inter-VRF encryption.

* * * * *

UNITED STATES PATENT AND TRADEMARK OFFICE
CERTIFICATE OF CORRECTION

PATENT NO. : 11,411,867 B1
APPLICATION NO. : 17/236230
DATED : August 9, 2022
INVENTOR(S) : Ravi Kumar Reddy Kottapalli et al.

Page 1 of 1

It is certified that error appears in the above-identified patent and that said Letters Patent is hereby corrected as shown below:

On the Title Page

(54) Title:
Delete "DYNAMICALLY MANAGING ENCRYPTION FOR VIRTUAL ROUTING (VRF) AND FORWARDING (VRF) USING ROUTE TARGETS AND UNIQUE VRF IDENTIFIERS"
And substitute therefor --DYNAMICALLY MANAGING ENCRYPTION FOR VIRTUAL ROUTING AND FORWARDING USING ROUTE TARGETS AND UNIQUE VIRTUAL ROUTING AND FORWARDING IDENTIFIERS--

In the Specification

In Column 1, Line 1-4:
Delete "DYNAMICALLY MANAGING ENCRYPTION FOR VIRTUAL ROUTING (VRF) AND FORWARDING (VRF) USING ROUTE TARGETS AND UNIQUE VRF IDENTIFIERS"
And substitute therefor --DYNAMICALLY MANAGING ENCRYPTION FOR VIRTUAL ROUTING AND FORWARDING USING ROUTE TARGETS AND UNIQUE VIRTUAL ROUTING AND FORWARDING IDENTIFIERS--

Signed and Sealed this
Twenty-ninth Day of November, 2022

Katherine Kelly Vidal
*Director of the United States Patent and Trademark Office*